US008549006B2

(12) United States Patent
Amer-Yahia et al.

(10) Patent No.: US 8,549,006 B2
(45) Date of Patent: *Oct. 1, 2013

(54) PHRASE MATCHING IN DOCUMENTS HAVING NESTED-STRUCTURE ARBITRARY (DOCUMENT-SPECIFIC) MARKUP

(75) Inventors: Sihem Amer-Yahia, New York, NY (US); Maria F. Fernandez, Madison, NJ (US); Divesh Srivastava, Summit, NJ (US); Yu Xu, La Jolla, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/042,287

(22) Filed: Mar. 4, 2008

(65) Prior Publication Data

US 2008/0154891 A1    Jun. 26, 2008

Related U.S. Application Data

(63) Continuation of application No. 10/765,675, filed on Jan. 27, 2004, now Pat. No. 7,356,528.

(60) Provisional application No. 60/470,698, filed on May 15, 2003.

(51) Int. Cl.
*G06F 7/00* (2006.01)

(52) U.S. Cl.
USPC .......................................................... 707/741

(58) Field of Classification Search
USPC ........................................... 707/999.006, 741
See application file for complete search history.

(56) References Cited

U.S. PATENT DOCUMENTS

| 6,438,540 | B2 * | 8/2002 | Nasr et al. ............................ 1/1 |
| 6,631,373 | B1 | 10/2003 | Otani et al. |
| 6,986,104 | B2 | 1/2006 | Green et al. |
| 7,356,528 | B1 * | 4/2008 | Amer-Yahia et al. ................. 1/1 |
| 2001/0007987 | A1 | 7/2001 | Igata |
| 2001/0027482 | A1 | 10/2001 | Ono et al. |
| 2002/0065814 | A1 * | 5/2002 | Okamoto et al. ................. 707/3 |
| 2002/0065822 | A1 * | 5/2002 | Itani .................................. 707/7 |
| 2003/0065655 | A1 | 4/2003 | Syeda-Mahmood |
| 2003/0101163 | A1 * | 5/2003 | Lui et al. .......................... 707/1 |
| 2003/0140035 | A1 * | 7/2003 | Burrows .......................... 707/3 |

OTHER PUBLICATIONS

Al-Khalifa et al., "Structural Joins: A Primitive for Efficient XML Query Pattern Matching," Proceedings of the 18th International Conference on Data Engineering, 2002.*

* cited by examiner

*Primary Examiner* — Jensen Hu

(57) ABSTRACT

A method of searching a document having nested-structure document-specific markup (such as Extensible Markup Language (XML)) involves 112 receiving a query that designates at least (A) a phrase to be matched in a phrase matching process, and (B) a selective designation of at least a tag or annotation that is to be ignored during the phrase matching process. The method further involves 114 deriving query-specific indices based on query-independent indices that were created specific to each document, and 116 carrying out the phrase matching process using the query-specific indices on the document having the nested-structure document-specific markup.

17 Claims, 12 Drawing Sheets

```
0.   /* Indexed Nested Loop (INL) Approach  */

1.   for each context interval ic in LC {
2.     witnessSet = { }
3.     index probe Lw1 to find first interval i1
4.         such that descendant(i1, ic)
5.     repeat {
6.       matchPos = 1;
7.       m = [ i1 ];
8.       repeat {
9.         probe (Lw(matchP os+1) U LM) to find
10.            i2 with i2.start = last(m).end+1;
11.        if (no match found) break;
12.        if (i2 ∈ Lw(matchPos+1)) matchPos++;
13.        m = append(m, i2);
14.        /* Matched last word in phrase */
15.      } until (matchPos = q)
16.      /* If a complete witness is found, save it */
17.      if (matchPos = q)
18.         witnessSet = witnessSet U { m };
19.      i1 = next(Lw1)
20.    } until not(descendant(i1, ic))
21.    output (ic, witnessSet)
22. }

23.  descendant(i1, i2) {
24.     i1.start > i2.start and i1.end < i2.end
25.  }
```

*FIG. 4*

```
0.   /* Stack-Based Merge (SBM) Approach */

1.   while (not(empty(L))) {
2.     i = remove-first(L);
3.     if (i ∈ LC) { /* i is context interval */
4.        if (not(empty(S))) &&
5.            not(descendant(i,top(S).interval)))
6.           output-and-clean(i);
7.     new-interval(i);
8.   } else { /* i is word or ignored markup */
9.     if (empty(S)) break;
10.    if (not(descendant(i, top(S).interval)))
11.       output-and-clean(i);
12.    /* i is descendant of top(S).interval */
13.    if (i ∈ LM) {
14.       extend-with-markup(i);
15.       if (i ∈ La_j)
16.          /* i is nested annotation */
17.          new-interval(i);
18.       } else if (i ∈ Lw pos)
19.          extend-with-word(i, pos)
20.    }
21.  }
22.  if (not(empty(S))) output-and-clean((0,0));
23.
24.  output-and-clean(i) {
25.    repeat {
26.      c = pop(S);
27.      if (c.interval ∈ LC) /* context interval */
28.         output(c.interval,c.witnessSet);
29.      /* Propagate nested witnesses up stack */
30.      top(S).witnessSet =
31.         top(S).witnessSet U c.witnessSet;
32.    } until (empty(S) or
33.             descendant(i,top(S).interval));
34.  }

35.  new-interval(i) {
36.    push((i, {}, {}), S);
37.  }
```

*FIG. 6A*

```
38.    discard-partial-match(m) {
39.      top(S).matchSet = top(S).matchSet - {m}
40.    }
41.    extend-with-markup(i) {
42.      for each m ∈ top(S).matchSet {
43.        if (i.start =
44.            last(m.partialWitness).end + 1)
45.          m.partialWitness = append(m.partialWitness, i);
46.        else
47.          discard-partial-match(m)
48.      }
49.    }
50.    extend-with-word(i, pos) {
51.      if (pos = 1) {
52.        top(S).matchSet = top(S).matchSet U ([ i ], 1);
53.      } else {
54.        for each m ∈ top(S).matchSet {
55.          if (m.matchPos + 1 = pos and i.start =
56.              last(m.partialWitness).end + 1) {
57.            m.partialWitness = append(m.partialWitness, i);
58.            m.matchPos++;
              /* Once matched complete phrase */
59.            if (m.matchPos = q) {
60.              /* Add to top witness set */
61.              top(S).witnessSet = top(S).witnessSet
                    U { m.partialWitness }
62.              discard-partial-match(m)
63.            }
64.          } else
65.            discard-partial-match(m)
66.        }
67.      }
68.    }
```

*FIG. 6B*

```
0.  /* Procedure for word-proximity matching */

1.  extend-with-word(i, pos) {
2.    for each m ∈ top(S).matchSet {
3.      if (m.matchPos + 1 = pos and i.start =
4.          last(m.partialWitness).end + 1) {
5.        m.partialWitness =
              append(m.partialWitness, i);
6.        m.matchPos++;
          /* Once matched complete phrase */
7.        if (m.matchPos = q) {
8.          /* Add to top witness set */
9.          top(S).witnessSet = top(S).witnessSet
              U { m.partialWitness }
10.         discard-partial-match(m)
11.       }
12.     } else if (m.skipped + i.start -
            last(m.partialWitness).end - 1 <= k) {
13.       m.skipped += i.start -
              last(m.partialWitness).end - 1;
14.       m.partialWitness =
              append(m.partialWitness, i);
15.     } else {
16.       discard-partial-match(m)
17.     }
18.     if (pos = 1) {
19.       top(S).matchSet =
20.           top(S).matchSet U ([ i ], 1, 0);
21.     }
22.   }
23. }
```

*FIG. 6C*

PHRASE MATCHING IN DOCUMENTS HAVING NESTED-STRUCTURE ARBITRARY (DOCUMENT-SPECIFIC) MARKUP

CROSS-REFERENCE TO RELATED APPLICATION

This application is a continuation of U.S. patent application Ser. No. 10/765,675 filed Jan. 27, 2004 now U.S. Pat. No. 7,356,528, entitled, "Phrase Matching in Documents Having Nested-Structure Arbitrary (Document-Specific) Markup, which has been allowed, which claims priority to related U.S. Provisional Application No. 60/470,698, filed May 15, 2003. The aforementioned related patent applications are herein incorporated by reference.

BACKGROUND OF THE INVENTION

1. Field of the Invention

The invention generally relates to arrangements for phrase matching in documents. More particularly, the invention relates to arrangements for phrase matching in documents that may contain nested-structure, arbitrary (document-specific) markup (including nested tags such as nested context, annotations, and the like).

2. Related Art

Extensible Markup Language (XML), and its ancestor Standard Generalized Markup Language (SGML), were originally developed by the document processing community for adding both structural and semantic markup to texts. XML's markup is considered "arbitrary" in that a document creator may define markup tags on a document-specific basis. Further, XML's markup structure may be "nested" in that context, annotations and the like may nested within other context, annotations and the like, and within each other.

Text sources such as Shakespeare's plays have been augmented to include markup describing scenes, speeches, and speakers (J. Bosak, *The plays of Shakespeare in XML* at the oasis-open.org web site). Classical literature abounds in commentaries added by literary critics (e.g., the Talmud contains commentaries on Biblical text). XML permits such commentaries to be easily identified via user-defined annotations. As a more recent example, the XML documents published by the Library Of Congress (LOC) contain the large texts of legislative bills; in these texts, the names of the sponsors of a bill and the committees to which a bill is referred are identified in the body of the bill with markup. XML can also be used to represent the output of natural-language processing systems; such output labels the grammatical structure of natural language text, for example, with subjects and verbs, and noun and adjective phrases (M. Marcus et al. Treebank-2, LDC catalog no. LDC95T7 (CD-ROM) Philadelphia: Linguistic Data Consortium, 1999).

In the absence of markup, phrase matching is a common technique to search text and identify relevant documents. Conventional phrase matching typically requires that words in a phrase be contiguous or in close proximity. For example, searching for the phrase "To be, or not to be" would return very different results than searching for the same set of words as individual keywords. Most information retrieval (IR) systems support phrase matching on text and on HTML documents, as they adopt the simple but effective expedient of ignoring universally recognized HTML tags.

However, XML provides nested arbitrary (document-specific) markup, including context and annotations. Accordingly, techniques of merely ignoring universally-recognized tags cannot be successfully extended to searching XML documents. Thus, there is a need in the art to provide a searching arrangement allowing one to specify which individual tags and complete annotations (i.e., elements and their content) to ignore.

For example, consider a phrase match query "Mr. English introduced this bill" in the XML document fragment in Table I, in which the query phrase is emphasized for purposes of discussion:

TABLE I

XML Document fragment (noncontiguous query phrase emphasized)

<sponsor>Mr. English</sponsor>
   <footnote>For himself and
     <co-sponsor>Mr. Coyne </co-sponsor>
   </footnote>
introduced this bill, which was referred to the
<committee-name>Committee on Financial Services</committee-name>

The phrase being sought is not contiguous: the words "English" and "introduced" are separated by:

a </sponsor> end tag, a <footnote> </footnote> complete annotation, and a <co-sponsor> </co-sponsor> complete annotation embedded within the footnote.

To properly respond to this query on this document fragment, it is necessary to ignore the </sponsor> end tag, and the entire <footnote> </footnote> annotation.

Specifying that the <co-sponsor> tag should be ignored does not change the result because ignoring the <footnote> </footnote> annotation implicitly causes the <co-sponsor> tag to be ignored. However, not specifying that the </sponsor> end tag should be ignored, does change the result.

While phrase matching in general is a common information retrieval (IR) technique to search text and identify relevant documents in a document collection, customized phrase matching required to search documents with markup such as XML's is not supported by conventional IR systems. Text may be interleaved with arbitrary and nested markup, thwarting search techniques that require strict contiguity or close proximity of keywords. Phrase matching in XML and similar languages having nested-structure document-specific markup presents new challenges for phrase matching. Thus, there is a need in the art for a technique for phrase matching in nested-structure document-specific markup languages that permits dynamic specification of both the phrase to be matched and particular markup, especially document-specific markup, to be ignored.

SUMMARY

A method of searching a document having nested-structure document-specific markup (such as Extensible Markup Language (XML)) involves receiving a query that designates at least (A) a phrase to be matched in a phrase matching process, and (B) a selective designation of at least a tag or annotation that is to be ignored during the phrase matching process. The method further involves deriving query-specific indices based on query-independent indices that were created specific to each document, and carrying out the phrase matching process using the query-specific indices on the document having the nested-structure document-specific markup.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIG. 4 illustrates simplified pseudo-code of the INL approach of FIGS. 3A-3B;

FIGS. 6A-6C illustrate simplified pseudo-code of the approach of FIG. 5.

DETAILED DESCRIPTION

Figure 1:
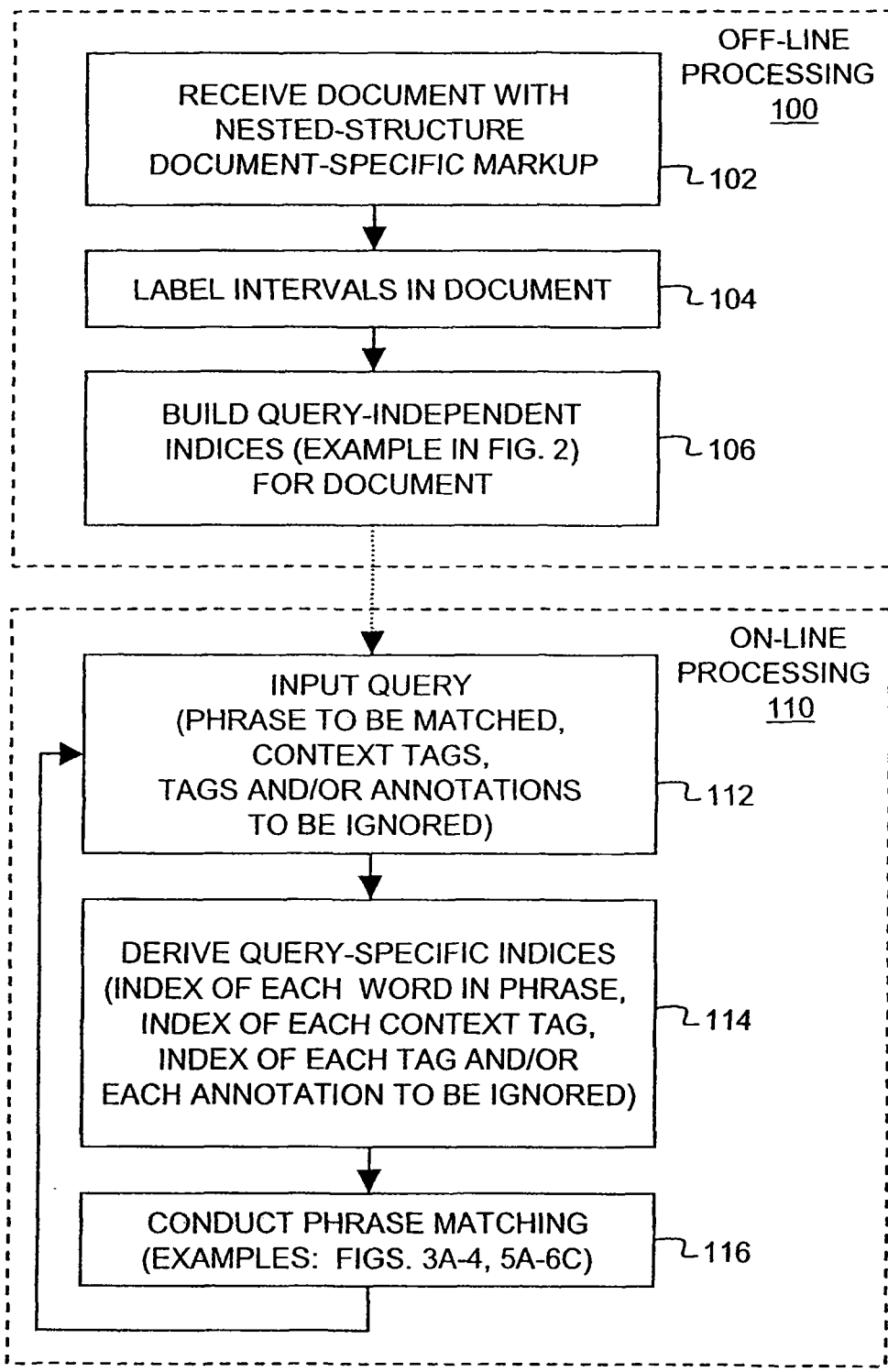
FIG. 1 is a high-level flow chart illustrating how a process of preparing document indices is performed before queries are received for phrase matching.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans.

Thus, the steps involved in methods described herein may be readily implemented by those skilled in the art without undue experimentation.

Further, various aspects, features and embodiments of the presence indication arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

As discussed in the Background, phrase matching in XML documents (or any documents in arbitrary-markup nested-markup languages) is not a trivial problem. Solutions to this problem should permit dynamic (i.e., at query time) specification of ignored tags and annotations, handle multiple and nested matches, permit specification of arbitrary document fragments as the search context, and support approximate matching. An approach discussed below meets these requirements in that it permits specification of the phrase to be matched either exactly or within a word proximity, the document contexts in which to restrict the phrase match, and the tags and annotations that should be ignored. The approach can also rank the results during matching.

Thus, the present arrangements for phrase matching in arbitrary-markup nested-markup languages such as XML, permit dynamic specification of not only the phrase to be matched, but also context tags restricting the scope of a phrase matching process, and markup (tags or annotations) that are to be ignored in the phrase matching process. Document-specific inverted indices on the positions of phrase words and tags are prepared off-line before a query is submitted, to allow the phrase matching process to be carried out efficiently once the query is submitted.

The methods disclosed herein may be used with a variety of user interfaces to allow a user to enter a query. A naive-user interface involves specifying a priori the tags and annotations to ignore, given knowledge about the application domain and the schemas for input documents. An interface to the Library of Congress archive, for example, might automatically ignore the co-sponsor and sponsor tags and the footnote annotations. An expert-user interface permits the user to specify the ignored markup, providing more control over phrase matching. Advantageously, customized phrase matching is easily integrated into XML query languages, such as "XQuery" (S. Boag, D. Chamberlin, M. F. Fernandez, D. Florescu, J. Robie, and J. Simeon. XQuery 1.0: An XML query language (W3C working draft available from w3.org web site (May 2003)), providing applications with all of XQuery's functionality in conjunction with phrase matching.

As a background to understanding the embodiments described herein, the following definitions and examples are provided, with the understanding that the scope of the claims should not be limited thereby.

XML: as used in this specification, Extensible Markup Language (XML) is meant to denote, not a specific version of an industry standard, but rather any markup language that supports nested structures and document-specific markup. That is, context tags (including semantic tags such as <sponsor> and document structure tags such as <paragraph>) and annotations may be nested within each other; tags may be uniquely defined for each document, as distinguished from, for example, HTML's set of universally recognized tags.

Text: characters that constitute the content of a document; character sets may be of any language (Roman, Latin, Japanese, Arabic, and so forth).

Tag: a command inserted in a document that specifies how the document or portion thereof should be formatted or how its structure or meaning should be interpreted. Tags generally come in pairs: opening and closing tags that delimit a fragment of the document. In XML, unlike HTML, tags may be user defined and document-specific, such as <sponsor> . . . </sponsor>; such tags (including context tags) may be nested.

Markup: characters and symbols (such as tags) that describe or give context to text that is associated with the markup (usually between opening and closing tags).

Element: constitutes an opening tag, a corresponding closing tag, and intervening items. In XML, elements may be nested.

Context: an element that is given a particular name. Context includes "structural" tags like <paragraph> . . . </paragraph> or <chapter> . . . </chapter> that reflect structural relations within a document; context also includes "semantic" tags like <sponsor> ... </sponsor> that express a higher level meaning of the tagged contents.

Annotation: an element whose tags define the context (footnote, paragraph, section, chapter, sponsor, committee, and so forth.) of the what is between the opening and closing tags, for example: <footnote> ... <footnote>. In XML, annotations may be nested and user-defined (document-specific).

Interval: defined by opening and closing index numbers, an interval begins with an opening tag and extends through a corresponding closing tag. Such intervals may be nested. If applied to a single word (as distinct from corresponding tags), an "interval" is considered to cover that single word only. Intervals are used in creating documents indexes later used in matching a query.

Document order: the sequential order of index numbers. In one embodiment, the order is contiguous. A first tag or word "precedes" a second tag or word in document order, if the index number of the first tag or word is less than the index number of the second tag or word.

Context interval: an interval of an element that contains at least one match of a phrase.

Witness: an occurrence (instance) of a phrase in a text.

Partial witness: a partial match of a larger phrase, as "President" is a partial witness of a phrase of "President Lincoln."

Phrase-match witness: a list of contiguous intervals that contain a list of phrase words and intervening intervals of ignored tags and ignored annotations.

Given this background understanding, reference is now made to FIG. 1, a high-level flow chart illustrating how a process of preparing document indices is performed before queries are received for phrase matching.

In FIG. 1 block 100 indicates processing that is preferably carried on "offline." Such processing may be considered preparatory processing that occurs before a user enters a query. Such processing is preferably completed beforehand because it involves a substantial amount of time-consuming processing that might involve unacceptable delays to a user if it were performed while the user were on line. Block 110 indicates processing that is performed "on-line," that is, while the user is actually using the system in real time.

Block 102 indicates the input of a document in a language having nested-structure markup and document-specific (for example, user-defined) markup. Extensible Markup Language (XML) is one such language.

Block 104 indicates a labeling of intervals in a document. For markup tags, the intervals are defined in terms of a starting index number associated with an opening markup tag and an ending index number associated with a closing markup tag that corresponds to the opening markup tag. For single words, the intervals are defined in terms of a single index number associated with the word. Table II shows a document fragment, interval designators being shown as index numbers following each opening markup tag (annotation) or word:

TABLE II

Example of Document Fragment Labeled with Intervals

<SPEECH(1,44)>
   <SPEAKER(2,4)>HAMLET3</SPEAKER>
   <LINE(5,43)>To6 be7, or8 not9 to10 be11:
      <COMMENT(12,38)>
      The 13 line 14
         <QUOTE(15,26)>To16 be17, or18 not19 to20 be21: that22 is23 the24 question25

TABLE II-continued

Example of Document Fragment Labeled with Intervals

</QUOTE> is27 one28 of29 the30 most31 quoted32 phrases33 in34 the35 English36 language37.
      </COMMENT>
   that39 is40 the41 question42:
   </LINE>
</SPEECH>

For example, the interval of the <speech> annotation is (1,44), indicating that the <speech> annotation interval extends from the first item (<speech> opening tag) through the 44th item (</speech> closing tag) of the context interval. In this case, the <speech> annotation interval is the entire interval of the document fragment. As an example of a shorter interval, the <speaker> annotation interval is (2,4), indicating that the <speaker> annotation interval extends from the second through fourth items of the document fragment. Numbers such as 1, 2, 4, and 44 may be called index numbers. During processing, the <speech> annotation interval be considered a "context interval."

"interval" of the individual word "English" is 36. Various instances of the word "to" occur at positions with index numbers 6, 10, 16, and 20.

The intervals associated with each word or annotation are stored in association with the corresponding word or annotation, in preparation for the following step of building query-independent indices for each word or tag of a document.

Block 106 indicates a step of forming the query-independent indices so that they are configured to be used in a subsequent searching method. For each word and tag in a document, an index is formed. Thus, each document is associated with a potentially large number of indices, explaining why this potentially time-consuming step 106 is preferably performed offline.

Figure 2:
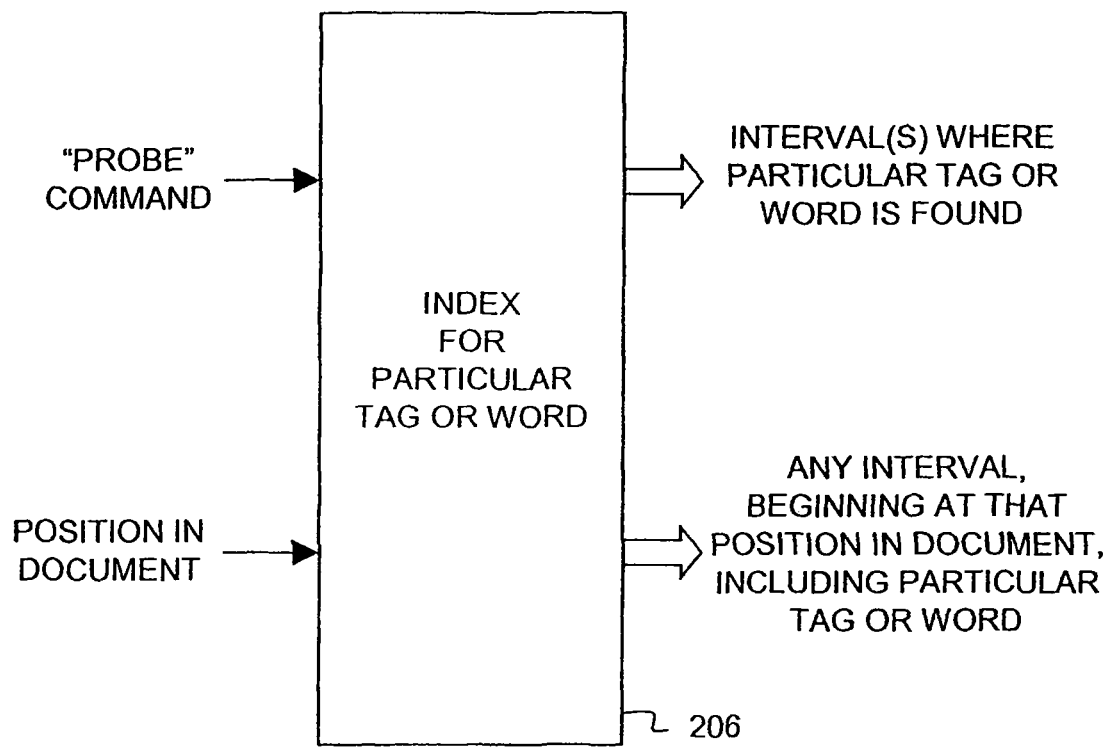
FIG. 2 is an input-output diagram of a query-independent index of particular tags or words, that may be generated in step 106 (FIG. 1)

FIG. 2 illustrates two uses of each query-independent index 206 that is generated in step 106:

The top of FIG. 2 illustrates an operation of the index 206 in which a "probe" command is input. When a "probe" command is input, the index yields each interval in document order at which that tag or word is found. An internal pointer is maintained, so that when a subsequent "probe" command is received, a subsequent interval, at which that tag or word is found, is output. The index may thus be scanned sequentially by a series of "probe" commands, to yield each interval in the document in which the tag or word is found.

The bottom of FIG. 2 illustrates an operation of the index 206 of a given tag or word. In this application, a Position in Document (such as the "index number" of Table II) is input to the index. In response, the index generates an interval, beginning at the Position in Document input, at which that particular tag or word is located in the document. For example, if a Position in Document is index number "234" and if the index 206 is for a "paragraph" tag and if the paragraph's closing tag is at a position with index number 299, then index 206 outputs Interval (234, 299). If the index 206 is for a word rather than a tag, then the interval output is a an interval of length 1. If the tag or word is not located at that Position in Document, the index 206 generates a suitable indication (such as a "False" output).

FIG. 2 performs the function, for a word or tag in the document, of receiving a position in the document and then indicating whether or not the word or tag is present at that position. Though FIG. 2 may appear to show the query-independent index as more than one element, it is emphasized that the fundamental index structure and content is one index, but only the input/output operations (that is, the uses or applications of the index) are separately illustrated. Given the present description and illustrations, those skilled in the art are readily capable of creating suitable indices for each tag or word in a document, indices possessing the above-described functionality.

Referring again to FIG. 1, after the query-independent indices are built in step 106, the system is ready for on-line processing, block 110.

Within block 110, block 112 indicates the input of a query by, for example, a human user. In one embodiment, a query may include:
- a phrase to be matched (for example, "Mr. English introduced this bill").
- context tags defining a context to which the phrase match should be restricted (for example, look only in <paragraph> contexts).
- tag(s), annotation(s), or both tag(s) and annotation(s), that are to be ignored during a subsequent phrase matching process (for example, ignore <footnote>, <sponsor> and <co-sponsor> annotations).

Significantly, whereas known arrangements input a phrase to be matched and strictly ignore all tags (such as universally known HTML tags), the ability for a user to selectively designate tags and/or entire annotations to be ignored is not provided by known arrangements. Likewise, conventional arrangements do not appear to allow restrictive use of context tags. This, the present approach permits successful, meaningful and flexible searching to be performed on documents in languages having nested-structure and document-specific markup, such as XML.

After a particular query has been input in block 112, query-specific indices are derived from the query-independent indices that were built in step 106. In one embodiment, the query-specific indices include:
- an index of each word in the query phrase
- an index of each context tag designated by the query
- an index of each tag or annotation that are to be ignored during phrase matching To save time, these indices do not have to be generated from scratch. Rather, they are derived from the query-independent indices (step 106) based on the query (step 112).

Finally, FIG. 1 step 116 illustrates the execution of a phrase matching process. As two examples, FIGS. 3-4 illustrate and explain a phrase matching process based on an indexed nested loop (INL) approach, and FIGS. 5-6B illustrate and explain a phrase matching process based on a stack-based merge approach. Other appropriate phrase matching processes may be employed Those skilled in the art will appreciate that different phrase matching approaches work better on different respective document data sets, and, accordingly, a most appropriate phrase matching approach may be adopted based on expected document data sets.

Two examples of approaches for phrase matching in XML documents are disclosed:
- an indexed nested loop (INL) method (FIGS. 3A-4)
- a stack-based merge method (FIGS. 5A-6C).

Both approaches process document contexts in document order, keeping track of nesting of document contexts, potential matches, and ignored markup to minimize redundant traversals.

First, the methods' input, their expected output, and the inverted indices on words and tags that they use, are described.

The input to each method includes:
- A set of context tags $C=c_1, \ldots, c_m$. Set C contains the tags of nodes in which to restrict phrase matching. (For example, SPEECH may be a context tag).
- A set of ignored tags $T=t_1, \ldots, t_k$. Set T contains the individual tags to be ignored during phrase matching.
- A set of tags of ignored annotations $A=a_1, \ldots, a_L$. Set A contains the tags of complete annotations to ignore within phrase matches.
- A list of phrase words, in order $W=[w_1, \ldots, w_q]$. List W contains the phrase words.

Before query processing, each element and text node in an input document is assigned a (start, end) interval, by a suitable known method such as, for example, S. Al-Khalifa, H. V. Jagadish, N. Koudas, J. M. Patel, D. Srivastava, and Y. Wu, "Structural joins: A primitive for efficient XML query pattern matching," *ICDE*, 2002. Each text node contains one word, so a text interval (i, i) is abbreviated as i. Intervals permit fast checking of the descendant and following-sibling relationships. For example, if node n has interval (s, e) then any node n' with interval $(s_i, e_i)$ such that $s < s_i$ and $e_i < e$ is a descendant of n; if $s_i = e+1$, then n' is the first sibling node following n, i.e., n and n' are contiguous in the document. Table I contains a fragment of an example document labeled with intervals.

The output of each method is a set of pairs that may be of a form:

(context interval ic, witness set {m})

The interval ic denotes an occurrence of a node whose tag is in C. Each of its witnesses is output, where a witness m is an ordered list of intervals $[i_1, \ldots, i_v]$ such that:
1. $i_1$ denotes an occurrence of word $w_1$, and $i_v$ denotes an occurrence of word $w_q$, $v \geq q$,
2. ic.start < $i_1$.start and $i_v$.end < ic.end,
3. for each $1 \leq j < v$, $i_j$.end = $i_{j+1}$.start−1,
4. there exists m', a subsequence of m of length q, such that the kth interval in m' denotes $w_k$, and
5. each interval in the remainder subsequence m\m' denotes an occurrence of ignored markup.

The first constraint guarantees that the first (or last) interval in the witness denotes the first (or last, respectively) phrase word. The second constraint guarantees the witness is contained within the given context. The third guarantees that the words and ignored markup in the witness are contiguous. The fourth constraint guarantees that all the words in the phrase occur in order. The fifth constraint guarantees that the remaining intervals in the witness denote ignored markup.

Both methods are dynamic in that the phrases to match and the tags and annotations to ignore need not be known until query time. Therefore, one inverted index is built offline, in one pass, for every tag and word in the input document. Each index is a list of intervals sorted by start position and may be accessed sequentially. Each index is also a partial function from a start position to an interval: that is, given a start position i and index L, probe(L,i) returns the interval (i, j) if it exists in L. The partial function may be implemented by a B-Tree over the sorted interval list.

At query time, the relevant indices are:
LC: Index of all intervals of context tags in C
Lwj: Index of all intervals of word w.
Ltj: Index of all intervals of ignored tag tj.
Laj: Index of all intervals of ignored annotation aj.

Two more indices are also constructed ("U" is the "union" (logical inclusive OR) operator):

LEtj: Index Uj {(s,s), (e,e) such that (s,e) ∈ Ltj} sorted by first component
LM: Index of all ignored markup U ((Uj Laj), (Uj LEtj)) sorted by first component For each ignored-tag interval in Ltj, the index LEtj contains one interval for the start position and one for the end position; this allows the methods to skip over individual tags, but not their content. The index LM is an interval list over all ignored markup in Laj and LEtj. Neither index is materialized, but is implemented using priority queues over the indexed lists Ltj and Laj. Both methods use LC, LM, and Lwj.

Figure 3A:
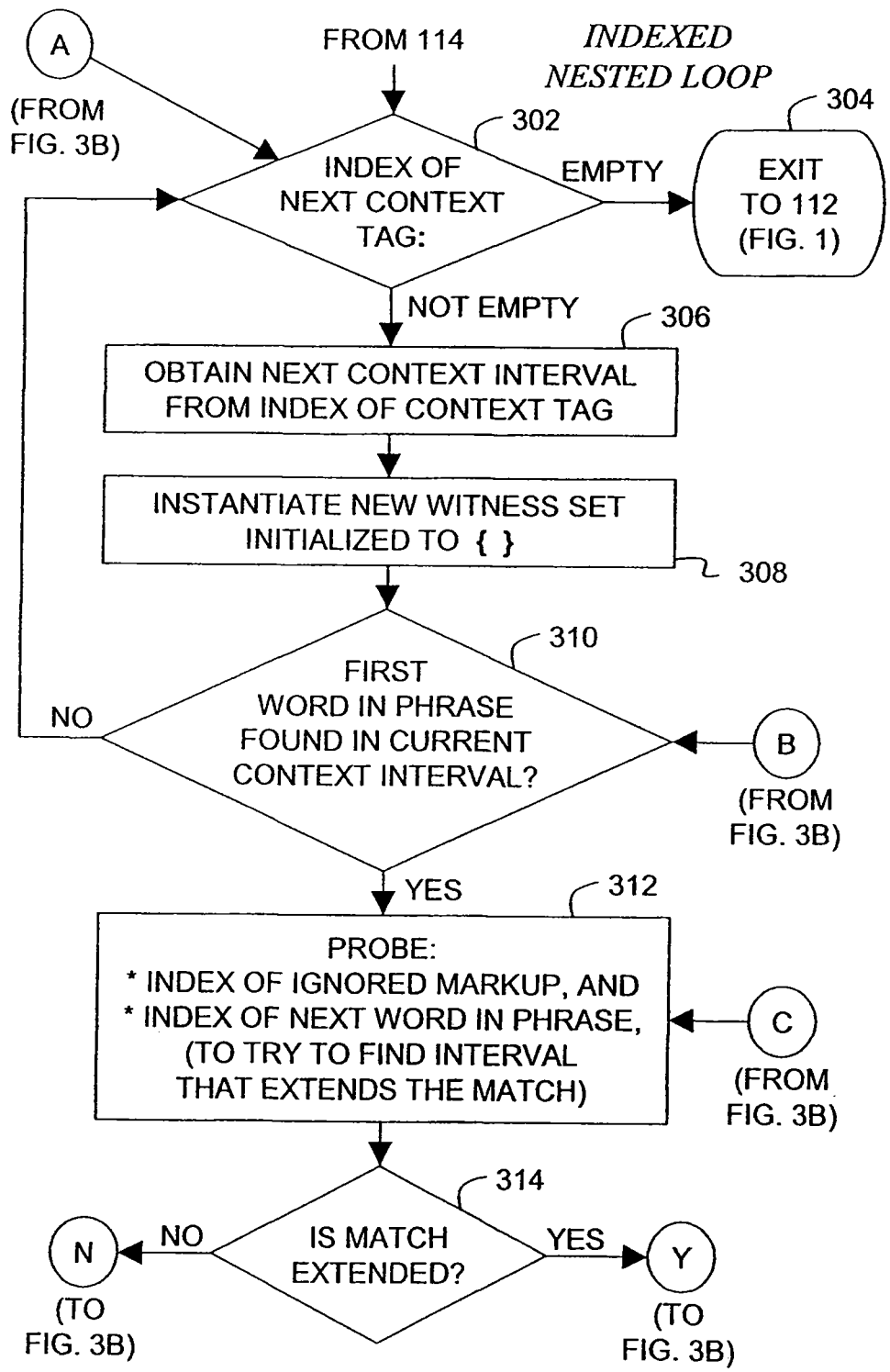
FIGS. 3A-3B (collectively referred to herein as "FIG. 3") constitute a flowchart illustrating a first embodiment of a phrase matching process using an inverted index of the positions of phrase words and tags in an indexed nested loop (INL) approach.
Figure 3B:
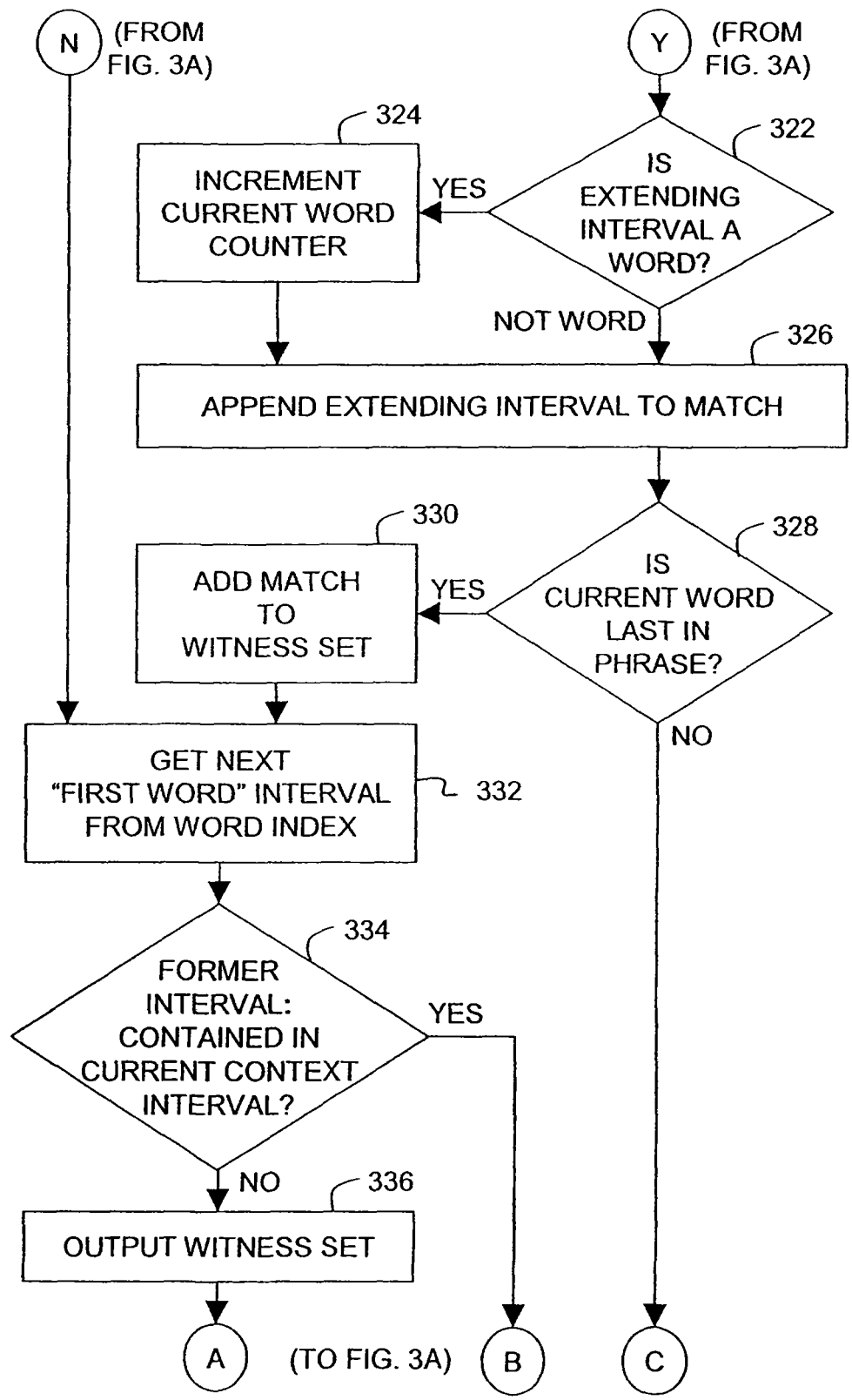

The Indexed Nested-Loop (INL) Approach (FIGS. 3A-4). FIGS. 3A-3B (collectively referred to as "FIG. 3") show an illustrative flowchart, and FIG. 4 shows pseudo-code for an example of an implementation, of the INL approach for phrase matching 116 (FIG. 1). It is not intended that there be an exact correlation between the flowchart and the pseudo-code, although each one may be used to more fully understand the other.

Decision block 302 indicates a decision of whether, based on inspection of an context tag index, a context interval under consideration is empty. If the context interval is empty, then control passes to block 304 which indicates completion of phrase matching and return to FIG. 1 block 112 to await entry of a subsequent query. However, if the interval is not empty, control passes to block 306. Essentially, step 302 ensures that all portions of a context interval under consideration that should be probed, are in fact probed, before phrase matching is considered completed.

Block 306 indicates a step of obtaining a next context interval from the index of the context tag.

Block 308 indicates a step of instantiating a new witness set, and initializing it to the empty set. As introduced above, a witness set is a set of possible results in a particular context under consideration.

Decision block 310 indicates a determination of whether a first occurrence of the first word in the query phrase is found in the current context interval. If the first word of the query phrase is not found in current context interval, control passes back to block 302 for processing of a subsequent context interval. However, if the first occurrence of the first word of the query phrase is found in the current context interval, then control passes to block 312.

Block 312 indicates the probing of the index of markup to be ignored and the index of the next word in the query phrase, the goal being to find an interval that extends a current match.

Decision block 314 indicates a determination of whether the match is in fact extended. If the match is extended, control passes via connector Y to block 322 (FIG. 3B). However, if the match is not extended, control passes via connector N to block 332 (FIG. 3B).

Referring to FIG. 3B, decision block 322 indicates whether the extending interval constitutes a word. If the extending interval is a word, then the current word counter is incremented in block 324 before the extended interval is appended to the match in block 326. However, if the extending interval is not a word (but is a context tag or ignored markup), then control passes direct to block 326 to append the extending interval to the match.

Decision block 328 indicates the determination of whether the current word is the last in the query phrase. If the current word is not the last in the query phrase, then control passes back via connector C to block 312 (FIG. 3A) so that the index of ignored markup and index of the next word in the phrase can be probed. However, if the current word is the last in the query phrase, control passes to block 330 so that the match can be added to the witness set before control passes to block 332.

If block 314 (FIG. 3A) determined that that match was not extended, then control passes directly to block 332 (FIG. 3B).

Block 332 indicates the step of obtaining a next "first word" interval from the word index.

Decision block 334 indicates the determination of whether the former interval is contained in the current context interval. If the former interval is contained in the current context interval, control passes back via connector B to block 310 (FIG. 3A) so that it can be determined whether the first word in the phrase is found in the current context interval. However, if the former interval is not contained in the current context interval, control passes to block 336 so that the witness set can be output and control can pass via connector A back to FIG. 3A block 302 (obtaining a next context interval, assuming it is not empty).

Reference is now made to FIG. 4 for illustrative pseudo-code for features of an INL implementation, which may be considered a variant of a nested loop method. Of course, the invention should not be limited to any particular implementations.

Each occurrence of the first word w1 in a context interval is a partial witness. For each such word, INL attempts to construct a complete witness by adding a contiguous sequence of ignored markup and other phrase words in order. In particular, for each context interval, the method probes Lw1 to find the first word in the phrase contained in the context interval (FIG. 4, lines 1-3) and constructs a partial witness containing this word (lines 6-7). The method then probes the index containing the ignored markup (LM) and the index containing the next word in the phrase (Lw(matchPos+1)), attempting to extend the current witness contiguously. If the witness cannot be extended, it is discarded and we start again (lines 11-12). The method continues extending the witness until every word is matched, then add the complete witness to the context interval's set of witnesses (line 17-19). When no more witnesses can be matched in the current context interval, the context interval and its set of witnesses (line 21) are output, and the process continues with the next context interval (line 1).

The outer-loop of the INL method is evaluated once for each context interval, and each witness is constructed independently of all other witnesses. This may result in redundant work, for example, when a context or annotation interval is nested within another context interval (as in Table I), because the intervals of the nested witness are traversed once when matching the witness itself and one or more times when matching the witness in which it is nested.

Indexed nested loop methods are well studied and understood for relational databases. The INL method is expected to have similar characteristics when the XML data is akin to relational data (for example, when there is no nesting of contexts and there are few tags and annotations to ignore). In cases where XML's heterogeneity is instantiated, however, the INL method tends to perform a large number of probes, many of which may be redundant. Thus, the Stack-Based Merge Method, described immediately below, is preferable for many datasets.

Stack-Based Merge (SBM) Method (FIGS. 5A-6C).

Just as the INL method may be considered analogous to index-nested loop methods for relational data, the stack-based merge (SBM) method may be considered analogous to traditional sort-merge join methods.

Like all sort-merge methods, the SBM method scans its input only once. In particular, SBM scans L (the combined list of words and ignored markup in order) and uses a stack S to keep track of nested context and annotation intervals and partial witnesses as they are identified within the nested intervals. These structures are defined as (U is the "union" (logical inclusive OR) operator):

L: Priority queue over U (LC, (UjLwj),LM)
S: Stack of (interval, witnessSet, matchSet) s
List L may be implemented as a priority queue over LC, LM, and Lwj. Each entry on stack S may be an (interval, witnessSet, matchSet) tuple, where:
"interval" is a context or annotation interval i,
"witnessSet" is a set of the complete witnesses matched in i, and
"matchSet" is a set of matches {m}.
A "match" m is a (partialWitness, matchPos) pair, where:
"partialWitness" is an interval list and
"matchPos" is the index of the last phrase word matched in the partial witness.

Because the first word in a phrase may be repeated within the phrase, a set of "partial witnesses" is maintained. For example, given the phrase "w1 w2 w1 w3" and the input "w1 w2 w'1 w'2 w"1 w3", both [w1 w2 w'1] and [w'1] are valid partial witnesses. The interval in the top entry of the stack may be referred to as the "top interval" and, similarly, for the "top witness set" and "top match set".

FIGS. 5A-5D (collectively referred to as "FIG. 5") show an illustrative flowchart, and FIGS. 6A-6C show pseudo-code for an example of an implementation, of the stack based merge (SBM) approach for phrase matching 116 (FIG. 1). It is not intended that there be an exact correlation between the flowchart and the pseudo-code (for example, FIG. 6C is not reflected in a flowchart); however, each one may be used to more fully understand the other.

Figure 5A:
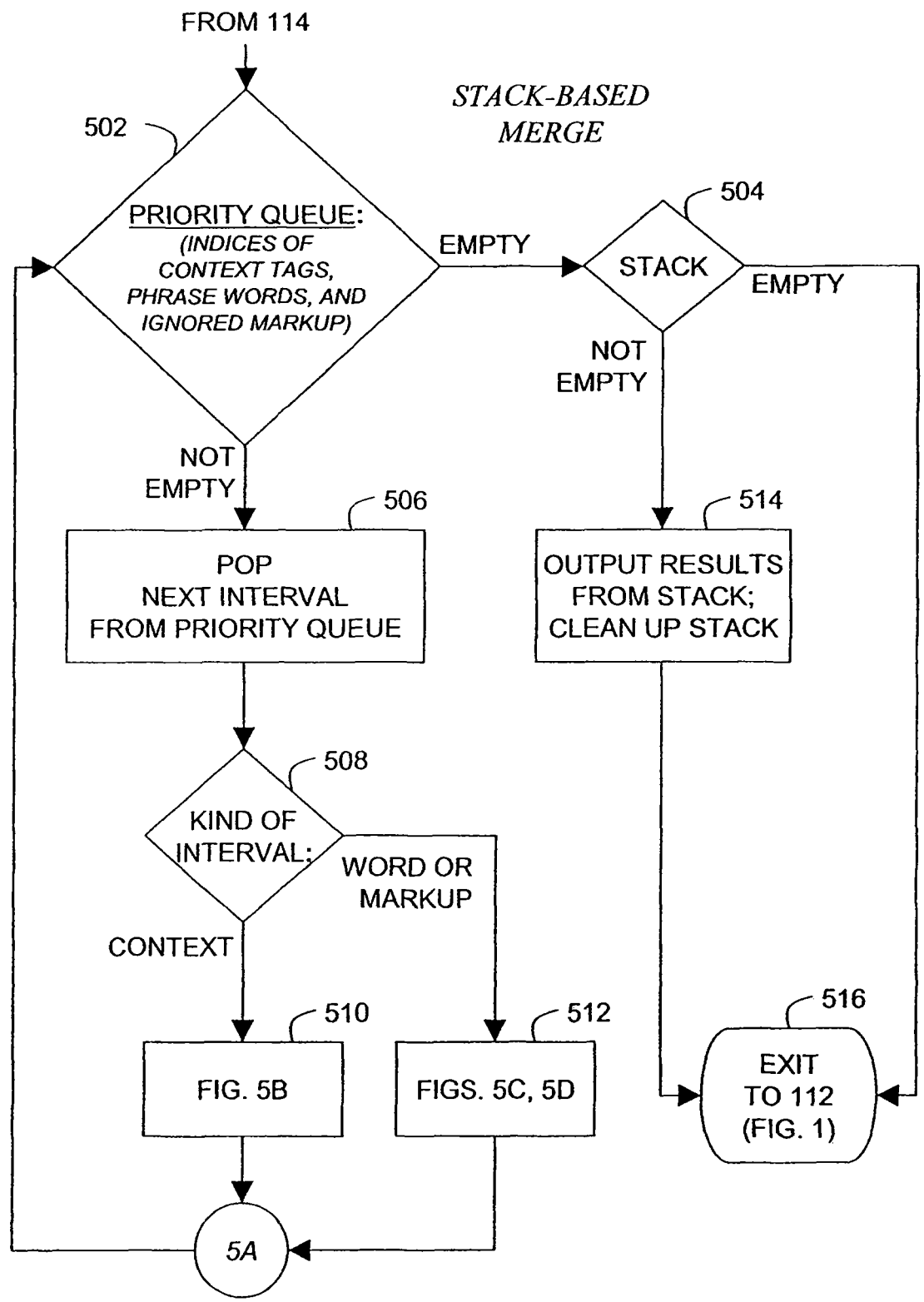
FIGS. 5A-5D (collectively referred to herein as "FIG. 5") constitute a flowchart illustrating a second embodiment of a phrase matching process, a stack-based merge (SBM) approach involving a single traversal of the document context through use of an inverted index of the positions of phrase words and tags and a LIFO data structure (stack) of possible results.

Referring now to FIG. 5A, decision block 502 indicates a determination of whether the priority queue over the various indices is empty or not empty. (The various indices include the index of all intervals of context tags, the index of phrase words, and the index of markup to be ignored.) Essentially, step 502 ensures that all context nodes, phrase words, and markup in a document are considered before phrase matching can be considered complete.

If decision block 502 determines that the queue is empty, then control passes to block 504 which determines whether the stack is empty. If the stack is not empty, then control passes to block 514 so that the stack results can be output and the stack can be cleaned up before block 516 (completion of phrase matching and return to FIG. 1 block 112 to await entry of a subsequent query). However, if the stack is empty, there are no results to output and control passes directly to block 516 (to await a subsequent query in FIG. 1 block 112).

However, if decision block 502 determines that the priority queue of indices is not empty, then control passes to block 506, which indicates the popping of a next interval from the priority queue. Thereafter, processing depends on the type of interval as determined by decision block 508. If the interval is a context interval, then control passes to FIG. 5B (symbolized by element 510). However, if the interval is a word or ignored markup, then control passes to FIG. 5C (symbolized by element 512).

Figure 5B:
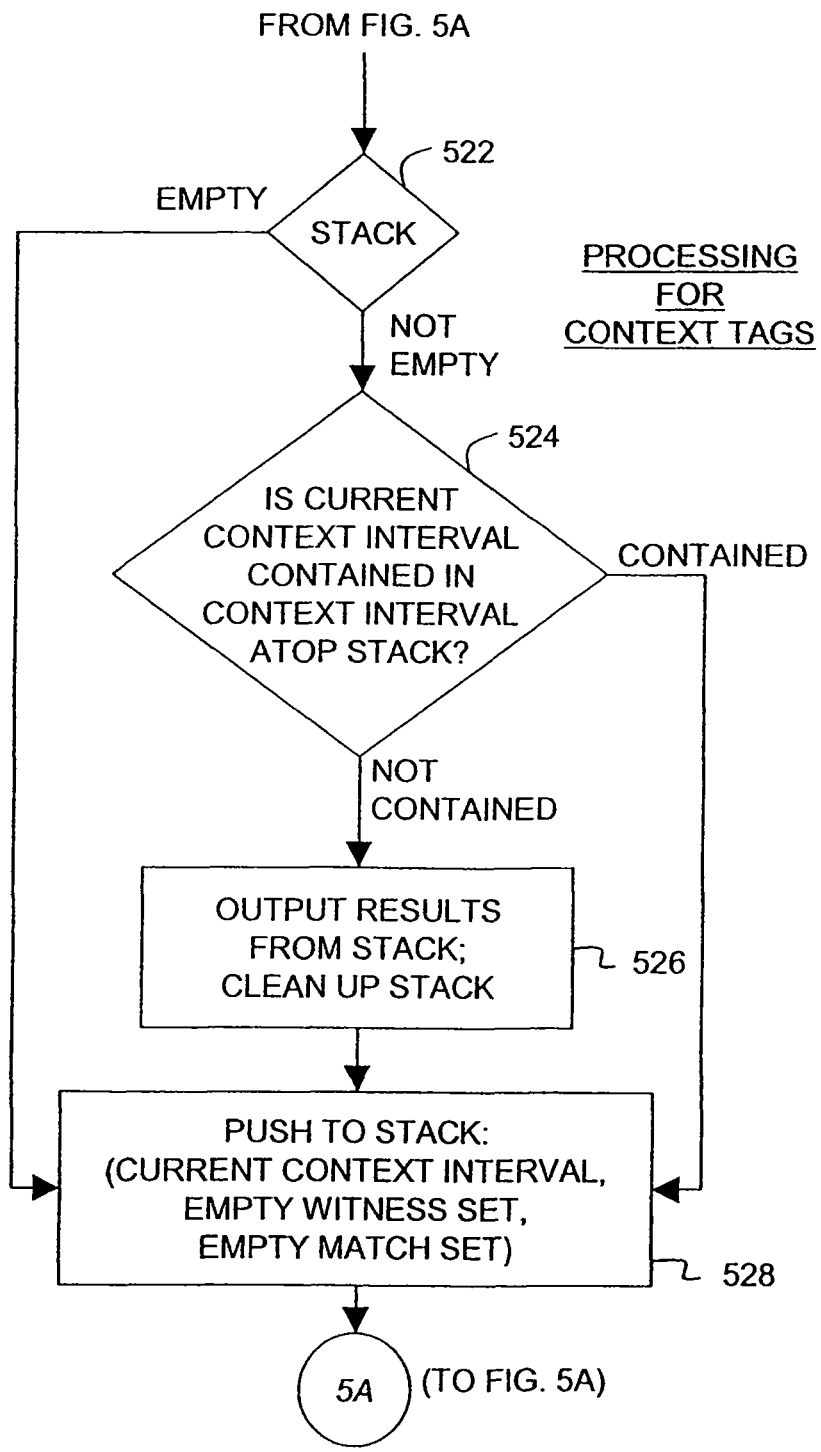

Referring to FIG. 5B (processing when the interval is a context interval), decision block 522 indicates a determination of whether or not the stack is empty. If the stack is not empty, control passes to block 524. However, if the stack is empty, control passes directly to block 528 (discussed below).

Decision block 524 indicates a determination of whether the current context interval is contained in the context interval that is on top of the stack. If the current context interval is contained in the context interval that is on top of the stack, then control passes directly to block 528 (discussed below). However, if the current context interval is not contained in the context interval that is on top of the stack, then control passes to block 526.

Block 526 indicates the output of results from the stack and the cleaning up of the stack before control passes to block 528.

Block 528 indicates that the stack is pushed (written to). In one embodiment, the information that is pushed includes the current context interval, a witness set that is initialized to the empty set, and a match set that is initialized to the empty set. After block 528, control passes via connector 5A back to FIG. 5A so that block 502 can determine whether or not the priority queue is yet empty.

Figure 5C:
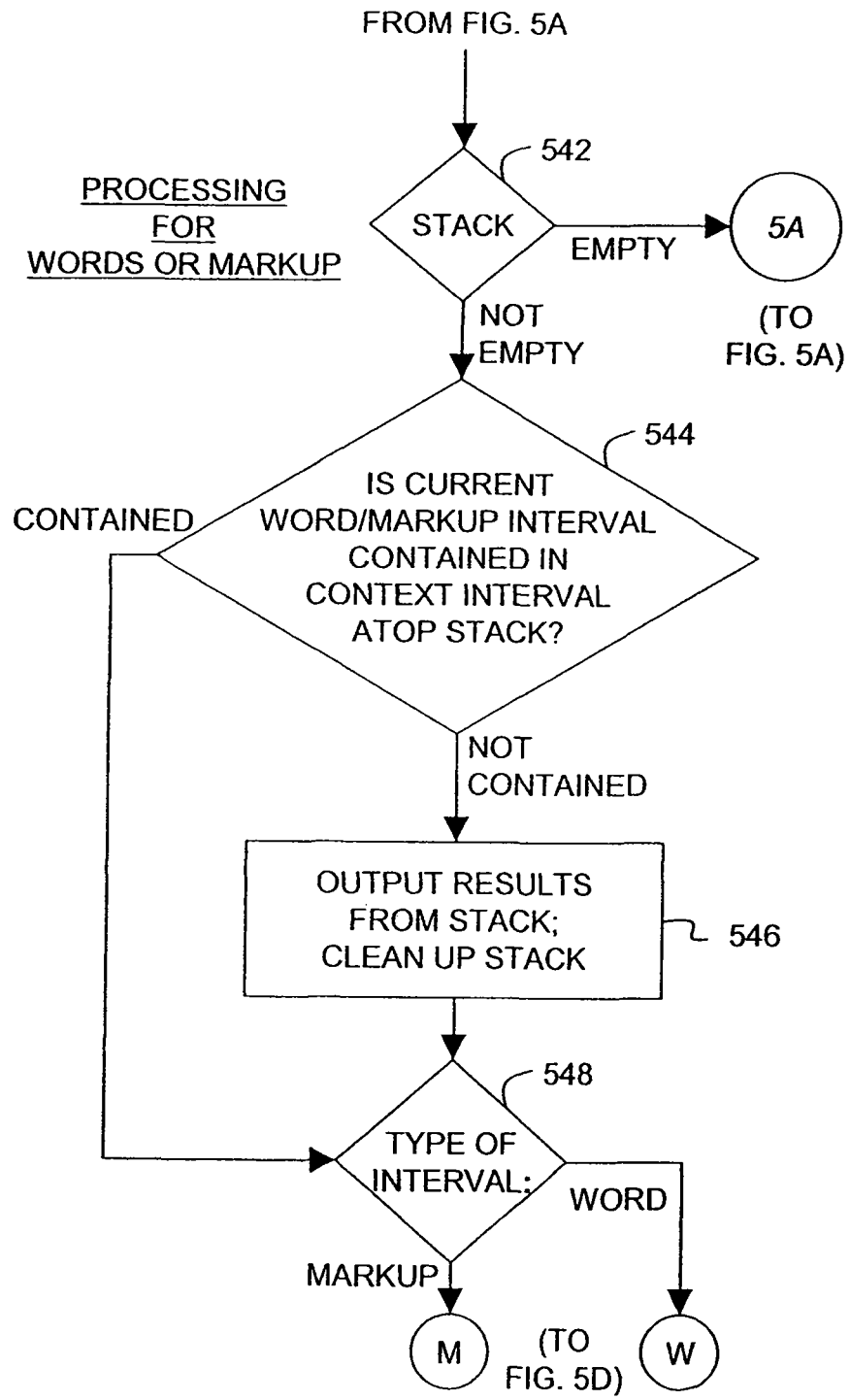

Referring now to FIG. 5C (processing when the interval is a word or markup), decision block 542 indicates a determination of whether or not the stack is empty. If the stack is empty, control passes via connector 5A back to FIG. 5A so that block 502 can determine whether or not the priority queue is yet empty. However, if the stack is not empty, then control passes to block 544.

Decision block 544 indicates a determination of whether the current interval (which is a word or ignored-markup) is contained in the context interval that is on top of the stack. If the current interval is contained in the context interval that is on top of the stack, then control passes directly to block 548 (described below). However, if the current interval is not contained in the context interval that is on top of the stack, then control passes to block 546.

Block 546 indicates the outputting of results from the stack and the cleaning up of the stack before control passes to block 548.

Decision block 548 indicates a determination of whether the present interval is ignored markup or a word. If the present interval is markup, then control passes via connector M to FIG. 5D block 562. However, if the present interval is a word, then control passes via connector W to FIG. 5D block 568.

Figure 5D:
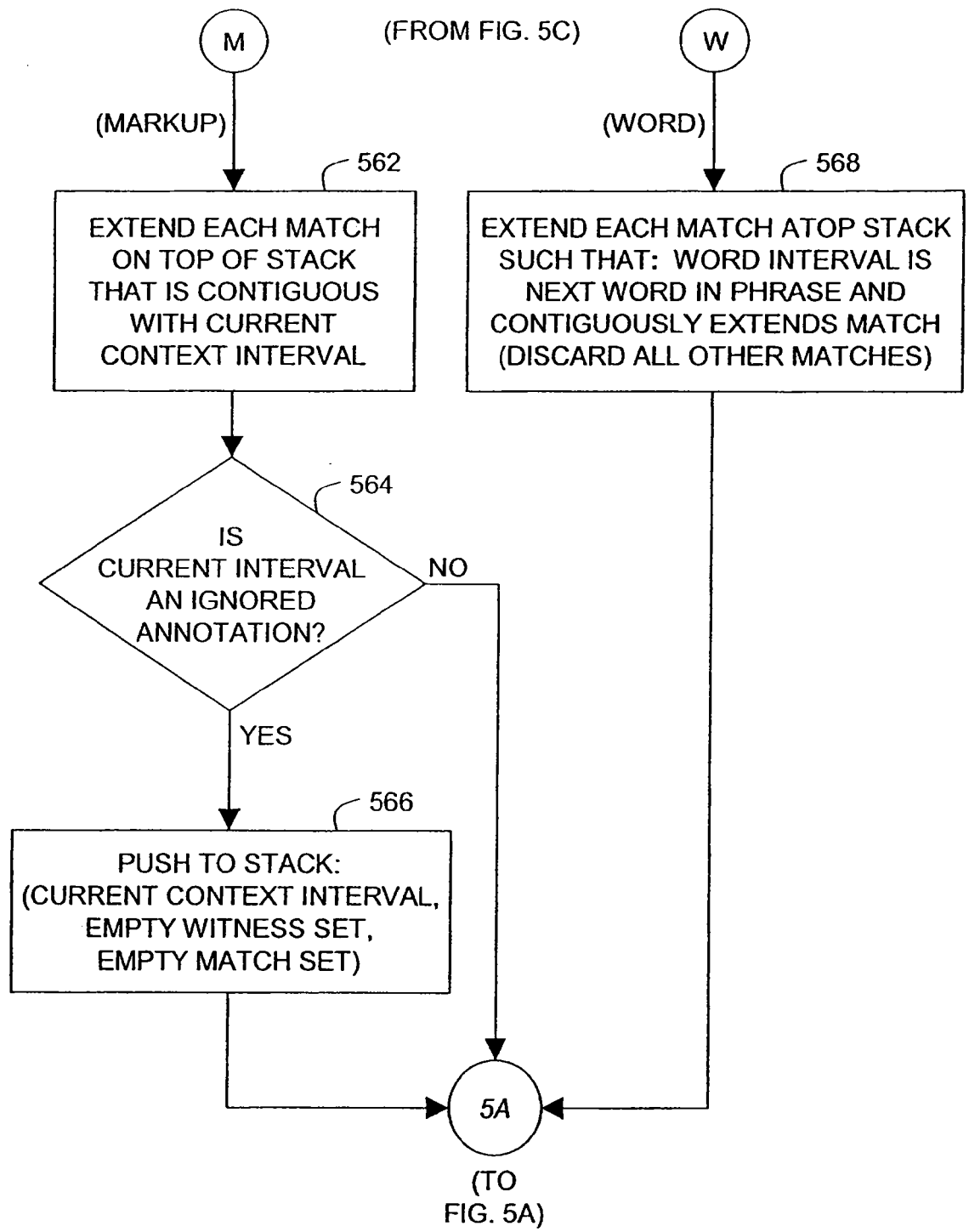

Referring now to FIG. 5D (further processing for intervals that are markup or a word), block 562 indicates a step (executed for intervals that are markup) of extending each match on top of the stack that is contiguous with the current context interval, before control passes to block 564.

Decision block 564 indicates a determination of whether the current interval, already known to be markup by FIG. 5C decision block 548, is an ignored annotation. If the current interval is not an annotation to be ignored, then control passes via connector 5A back to FIG. 5A so that block 502 can determine whether or not the priority queue is yet empty. However, if the current interval is an annotation to be ignored, then control passes to block 566.

Block 566 indicates that the stack is pushed (written to). In one embodiment, the information that is pushed includes the current context interval, a witness set that is initialized to the empty set, and a match set that is initialized to the empty set. After block 566, control passes via connector 5A back to FIG. 5A so that block 502 can determine whether or not the priority queue is yet empty.

If FIG. 5D was entered through connector W, indicating the present interval is a word, then control passes to block 568. Block 568 indicates the extending of each match on top of the stack that satisfies the condition that the word interval is the next word in the query phrase and contiguously extends the match. That is, if the word is at position "n" in the query phrase, those matches are extended only if words 1 through (n−1) are matches also. After block 568, control passes via connector 5A back to FIG. 5A so that block 502 can determine whether or not the priority queue is yet empty.

FIGS. 6A and 6B (collectively referred to herein as "FIG. 6") show illustrative pseudo-code for one implementation of the SBM method. FIG. 6C is pseudo-code for a procedure that may extend the method of FIGS. 6A, 6B to word-proximity matching.

The SBM method scans L (the combined list of words and ignored markup) in order (FIG. 6A, lines 1-2). The interval i is either a new context interval (FIG. 6A, lines 3-7) or a word or ignored markup (lines 8-20).

If i is a context interval and i is not a descendant of the top interval, then the top interval and its partial witnesses will never be complete, so the method cleans the stacks by calling the procedure output-and-clean (lines 4-6), which pops S until i is a descendant of the top interval or S is empty (lines 25-33). As context intervals are popped from S, their witness sets are output (lines 27-28) and are propagated up the stack to their closest containing interval (lines 30-31). After cleaning the stack, a new interval is created in which to match phrases by calling new-interval on line 7.

If i is either a phrase word or ignored markup and S is empty, the method discards the interval, because there is no current context (line 9). Otherwise, if i is not a descendant of the top interval, the method again cleans the stack (lines 10-11).

Once the method encounters a word or markup i that is a descendant of the top interval, it attempts to create or extend a partial witness. If i is markup, it calls extend-with-markup (lines 13-14). In extend-with-markup, the method attempts to extend each partial witness in the top match set (lines 43-45). If some partial witness cannot be extended, it is discarded (line 47). An ignored annotation, in addition to extending a partial witness, may contain witnesses itself, so the method pushes a new interval for the annotation (lines 15-17) and continues matching phrases within the annotation. Phrase matching within an annotation interval is identical to that within a context interval, except that witnesses within an annotation are propagated up the stack and output along with all the other witnesses in the nearest context interval.

If i is a word, the method attempts to create or extend a partial witness by calling extend-with-word (lines 18-19). If i denotes the first word w1, extend-with-word starts a new partial witness (lines 51-52), otherwise, it attempts to extend contiguously each partial witness (lines 53-58). If a witness is completed, it is added to the witness set of the top interval (lines 59-63). If a partial witness cannot be extended, it is discarded (lines 64-66).

When L is exhausted, the method outputs the remaining complete witnesses on the stack (line 22).

The SBM method may be considered a generalization of structural join methods of the Al-Khalifa publication noted above (which use stacks to identify ancestor-descendant pairs by sequentially scanning through interval lists) to take into account the order of phrase words. This necessitates building sets of partial witnesses and incrementally extending them in the SBM method; no such mechanism is needed for the structural join methods of the Al-Khalifa publication and accordingly the present SBM method is not an obvious extension or application of the teachings of the Al-Khalifa publication.

The SBM method has several advantages. The SBM method traverses once each of the interval lists of phrase words, ignored tags, ignored annotations, and contexts. It maintains in memory one stack, whose maximum depth is bounded by the maximum nesting depth of context and annotation intervals. Thus, the stack is bounded by the nesting depth of the XML document. Each entry on the stack maintains a set of partial witnesses, including one or more matches of the phrase words and any ignored markup. The number of partial witnesses is bounded by the number of occurrences of the first word in the phrase. The size of each partial witness depends on the number of words in the phrase, and the number of occurrences of intervening markup to be ignored. When this number is small (which is often the case), the stacks fit in main memory. The I/O complexity of the SBM method is, hence, linear in the sum of the input and output sizes. This makes the SBM method optimal among all methods that read their entire input and produce the complete output.

Furthermore, the SBM method may be used for proximity phrase matching (compared with exact phrase matching) within a proximity of k words. A counter ("skipped") is included in each match m in matchset; the counter contains the number of words that have been skipped while constructing the m's partial witness. A partial witness can be extended as long as its skipped value is <=k.

FIG. 6C shows illustrative pseudo-code for an implementation of procedure extend-with-word modified to support word proximity. It attempts to extend contiguously each partial witness just as in the original SBM procedure (lines 3-12). If the partial witness cannot be contiguously extended with the new word, but the number of skipped words would not exceed k, it extends the partial witness and increments the number of skipped words (lines 12-15). Otherwise, the partial witness is discarded, because it cannot be extended and its proximity limit is exceeded (line 16). Finally, if i denotes the first word w1, the method starts a new partial witness (lines 18-21) after examining the other partial witnesses, because the first word might also extend some of these as a skipped word.

As an example of proximity phrase matching, consider the data "w1 w2 w'1 w3 w'2 w'3 w4" (here, "primes" or apostrophes are used, as in w1 and w'1, to distinguish different occurrences of the same word in the data). Consider also the query phrase "w1 w2 w3 w4", to be matched within three words. After the word w'3 is processed, there are two partial witnesses: ([w1,w2,w'1,w3,w'2,w'3], 3, 3) and ([w'1,w3,w'2, w'3], 3, 1). In the first partial witness, the words w'1,w'2,w'3 are skipped words; in the second partial witness, the word w3 is a skipped word. Each of these partial witnesses can be extended with w4 to obtain complete witnesses. Note that this method reports the first witness beginning with a particular occurrence of w1, but does not report all overlapping witnesses. For example, it does not report w1 w2 w'1 w3 w'2 w'3 w4 in which the phrase words w2,w'1,w3 are the skipped words.

Also provided, for the methods described herein, are computer program products (such as storage media) storing program instructions for execution on a computer system having at least one data processing device, which instructions when executed by the computer system cause the computer system to perform the methods described herein.

Further provided are systems for performing the methods described herein, the systems including at least one data processing element. Generally, these elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

The arrangement provides at least one computer readable medium. Examples of computer readable media include compact discs, hard disks, floppy disks, tape, magneto optical disks, PROMs (for example, EPROM, EEPROM, Flash EPROM), DRAM, SRAM, SDRAM.

Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth.

Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The foregoing description supports a method of searching a document having nested-structure document-specific markup. The method may involve (112) receiving a query that designates at least (A) a phrase to be matched in a phrase matching process, and (B) a selective designation of at least a tag or annotation that is to be ignored during the phrase matching process; (114) deriving query-specific indices based on query-independent indices that were created specific to each document; and (116) carrying out the phrase matching process using the query-specific indices on the document having nested-structure document-specific markup.

The query-independent indices may be created by a method including (104) labeling elements in the document with intervals, in which (a1) for markup tags, the intervals are defined in terms of a starting index number associated with an opening markup tag and an ending index number associated with a closing markup tag that corresponds to the opening markup tag, and in which (a2) for single words, the intervals are defined in terms of a single index number associated with the word. The method may further include (106) forming the query-independent indices (206) so that they are configured to be used in the searching method (116) by first receiving, for a word or tag in the document, a position in the document, and by then indicating whether or not the word or tag is present at that position.

The step (114) of deriving the query-specific indices may involve deriving the query-specific indices from the query-independent indices without rebuilding any of the query-independent indices.

The step (114) of deriving the query-specific indices may include forming at least one of a group including an index of each word in the phrase to be matched by the phrase matching process, an index of context tags that may be found in the document, and an index of at least a tag or annotation to be ignored during the phrase matching process.

The phrase matching process (INL; FIGS. 3,4) may include a step, for each context interval, defined by a beginning index defining a position of beginning tag and a closing index defining a position of a closing tag, performing an index-nested loop by probing an index of each phrase word in order, and an index of each tag or annotation to be ignored, so as to construct at least one witness. Each witness is a contiguous sequence of intervals contained within the context interval and includes each phrase word occurrence exactly once and in phrase order. At least one witness may include each phrase word occurrence exactly once and in phrase order, interleaved with tags or annotations to be ignored.

The phrase matching process (SBM; FIGS. 5, 6A, 6B) may include scanning, in document order, a combined index of (A) phrase words and (B) tags or annotations to be ignored, while using a stack to keep track of nested context intervals and annotation intervals. The stack may includes at least one entry corresponding to a current context interval in which witnesses are identified. The at least one entry maintains a set of (A) partial witnesses that are being identified and (B) complete witnesses that have been identified, within the current context interval.

The query (112) may further designate a set of context tags defining a context to which the phrase match should be restricted.

The document's nested-structure document-specific markup may be in Extensible Markup Language (XML).

The receiving step may include receiving a query that designates at least a phrase to be proximity-matched in the phrase matching process, and the phrase matching process may involve proximity phrase matching (as distinguished from exact phrase matching).

The foregoing description further supports a method of creating query-independent indices suitable for use in searching a document having nested-structure document-specific markup. The method may involve (104) labeling elements in the document with intervals, in which (1) for markup tags, the intervals are defined in terms of a starting index number associated with an opening markup tag and an ending index number associated with a closing markup tag that corresponds to the opening markup tag, and in which (2) for single words, the intervals are defined in terms of a single index number associated with the word. The method may further involve (106) b) forming the query-independent indices (206) so that they are configured to be used in the searching method (116) by first receiving, for a word or tag in the document, a position in the document, and by then indicating whether or not the word or tag is present at that position.

The document's nested-structure document-specific markup may be in Extensible Markup Language (XML).

The foregoing description further supports a computer program product including computer executable code or computer executable instructions that, when executed, causes a computer to perform the governing step.

The foregoing description further supports a system configured to perform the methods described above.

Many alternatives, modifications, and variations will be apparent to those skilled in the art in light of the above teachings. For example, the choice of hardware or software on which the inventive methods are implemented, and the distribution of where in hardware or software steps of those methods are executed, may be varied while remaining within the scope of the invention. It is therefore to be understood that within the scope of the appended claims and their equivalents, the invention may be practiced otherwise than as specifically described herein.

What is claimed:

1. A method of searching a document having nested-structure document-specific markup, comprising:
   receiving, by a processor, a query that designates a phrase to be matched in a phrase matching process;
   deriving, by the processor, query-specific indices based on query-independent indices that were created specific to the document, wherein the query-independent indices were created comprising forming the query-independent indices by first receiving,
      for a word in the document, a first position in the document, and then by indicating whether or not the word is present at that first position, and
      for a tag in the document, a second position in the document, and then by indicating whether or not the tag is present at that second position; and
   performing, by the processor, the phrase matching process using the query-specific indices on the document having the nested-structure document-specific markup,
   wherein the query-independent indices were created further comprising:
   labeling elements in the document with intervals, wherein:
      for markup tags, the intervals are defined in terms of a starting index number associated with an opening markup tag and an ending index number associated with a closing markup tag that corresponds to the opening markup tag, and
      for a single word, the intervals are defined in terms of a single index number associated with the single word.

2. The method of claim 1, wherein the deriving the query-specific indices involves deriving the query-specific indices from the query-independent indices without rebuilding any of the query-independent indices.

3. The method of claim 1, wherein the query further designates:
   a set of context tags defining a context to which the phrase match is be restricted.

4. The method of claim 1, wherein:
   the nested-structure document-specific markup of the document is in extensible markup language.

5. The method of claim 1, wherein:
   the receiving comprises receiving the query that designates a phrase to be proximity-matched in the phrase matching process; and
   the phrase matching process involves proximity phrase matching as distinguished from exact phrase matching.

6. A method of creating query-independent indices for use in searching a document having nested-structure document-specific markup, comprising:
   labeling, by a processor, elements in the document with intervals, wherein:
      for markup tags, the intervals are defined in terms of a starting index number associated with an opening markup tag and an ending index number associated with a closing markup tag that corresponds to the opening markup tag, and
      for a single word, the intervals are defined in terms of a single index number associated with the single word; and
   forming, by the processor, the query-independent indices by first receiving,
      for a word in the document, a first position in the document, and then by indicating whether or not the word is present at that first position, and
      for a tag in the document, a second position in the document, and then by indicating whether or not the tag is present at that second position.

7. The method of claim 6, wherein:
   the nested-structure document-specific markup of the document is in extensible markup language.

8. A non-transitory computer readable medium storing a plurality of instructions which, when executed by a processor, cause the processor to perform operations of searching a document having nested-structure document-specific markup, the operations comprising:
   receiving a query that designates a phrase to be matched in a phrase matching process;
   deriving query-specific indices based on query-independent indices that were created specific to the document, wherein the query-independent indices were created comprising forming the query-independent indices by first receiving,
      for a word in the document, a first position in the document, and then by indicating whether or not the word is present at that first position, and
      for a tag in the document, a second position in the document, and then by indicating whether or not the tag is present at that second position; and
   carrying-out performing the phrase matching process using the query-specific indices on the document having the nested-structure document-specific markup,
   wherein the query-independent indices were created further comprising:
   labeling elements in the document with intervals, wherein:
      for markup tags, the intervals are defined in terms of a starting index number associated with an opening markup tag and an ending index number associated with a closing markup tag that corresponds to the opening markup tag, and
      for a single word, the intervals are defined in terms of a single index number associated with the single word.

9. The non-transitory computer readable medium of claim 8, wherein the deriving the query-specific indices involves deriving the query-specific indices from the query-independent indices without rebuilding any of the query-independent indices.

10. The non-transitory computer readable medium of claim 8, wherein the query further designates:
    a set of context tags defining a context to which the phrase match is be restricted.

11. The non-transitory computer readable medium of claim 8, wherein:
    the nested-structure document-specific markup of the document is in extensible markup language.

12. The non-transitory computer readable medium of claim 8, wherein:
    the receiving comprises receiving the query that designates a phrase to be proximity-matched in the phrase matching process; and the phrase matching process involves proximity phrase matching as distinguished from exact phrase matching.

13. A non-transitory computer readable medium storing a plurality of instructions which, when executed by a processor, cause the processor to perform operations of creating query-independent indices suitable for use in searching a document having nested-structure document-specific markup, the operations comprising:
  labeling elements in the document with intervals, wherein:
    for markup tags, the intervals are defined in terms of a starting index number associated with an opening markup tag and an ending index number associated with a closing markup tag that corresponds to the opening markup tag, and
    for a single word, the intervals are defined in terms of a single index number associated with the single word; and
  forming the query-independent indices by first receiving,
    for a word in the document, a position in the document, and then by indicating whether or not the word is present at that position, and
    for a tag in the document, a position in the document, and then by indicating whether or not the tag is present at that position.

14. The non-transitory computer readable medium of claim 13, wherein:
  the nested-structure document-specific markup of the document is in extensible markup language.

15. A system for searching a document having nested-structure document-specific markup, comprising:
  a processor; and
  a computer readable medium storing a plurality of instructions which, when executed by the processor, cause the processor to perform operations, the operations comprising:
    receiving a query that designates a phrase to be matched in a phrase matching process;
    deriving query-specific indices based on query-independent indices that were created specific to the document, wherein the query-independent indices were created by forming the query-independent indices by first receiving,
      for a word in the document, a first position in the document, and then by indicating whether or not the word is present at that first position, and
      for a tag in the document, a second position in the document, and then by indicating whether or not the tag is present at that second position; and
    performing the phrase matching process using the query-specific indices on the document having the nested-structure document-specific markup,
  wherein the query-independent indices were created further comprising:
    labeling elements in the document with intervals, wherein:
      for markup tags, the intervals are defined in terms of a starting index number associated with an opening markup tag and an ending index number associated with a closing markup tag that corresponds to the opening markup tag, and
      for a single word, the intervals are defined in terms of a single index number associated with the single word.

16. The system of claim 15, wherein the deriving the query-specific indices involves deriving the query-specific indices from the query-independent indices without rebuilding any of the query-independent indices.

17. A system for creating query-independent indices suitable for use in searching a document having nested-structure document-specific markup, comprising:
  a processor; and
  a computer readable medium storing a plurality of instructions which, when executed by the processor, cause the processor to perform operations, the operations comprising:
    labeling elements in the document with intervals, wherein:
      for markup tags, the intervals are defined in terms of a starting index number associated with an opening markup tag and an ending index number associated with a closing markup tag that corresponds to the opening markup tag, and
      for a single word, the intervals are defined in terms of a single index number associated with the single word; and
    forming the query-independent indices by first receiving,
      for a word in the document, a first position in the document, and then by indicating whether or not the word is present at that first position, and
      for a tag in the document, a second position in the document, and then by indicating whether or not the tag is present at that second position.

* * * * *